(12) United States Patent
Mane (10) Patent No.: US 12,124,799 B2
(45) Date of Patent: *Oct. 22, 2024

(54) METHOD AND SYSTEM FOR ADVANCED DOCUMENT REDACTION

(71) Applicant: Genpact USA, Inc., New York, NY (US)

(72) Inventor: Shishir Mane, Pune (IN)

(73) Assignee: Genpact USA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/085,998

(22) Filed: Dec. 21, 2022

(65) Prior Publication Data

US 2023/0205988 A1 Jun. 29, 2023

Related U.S. Application Data

(63) Continuation of application No. 16/373,216, filed on Apr. 2, 2019, now Pat. No. 11,562,134.

(51) Int. Cl.
*G06F 40/205* (2020.01)
*G06F 16/33* (2019.01)
(Continued)

(52) U.S. Cl.
CPC ........ *G06F 40/205* (2020.01); *G06F 16/3344* (2019.01); *G06F 21/6254* (2013.01);
(Continued)

(58) Field of Classification Search
CPC .. G06F 21/6254; G06F 40/166; G06F 40/205; G06F 21/6245; G06F 40/253; H04L 2209/42
See application file for complete search history.

(56) References Cited

U.S. PATENT DOCUMENTS 6,678,822 B1 * 1/2004 Morar ................ G06Q 10/0875
713/153
7,428,701 B1 9/2008 Gavin et al.
(Continued)

FOREIGN PATENT DOCUMENTS

CA 3061638 A1 * 11/2018 ............. G06F 21/00

OTHER PUBLICATIONS

Merriam-Webster, definition for the word "feed", archived in the Wayback Machine on Oct. 21, 2018; 21 pages, https://www.merriam-webster.com/dictionary/feed, https://web.archive.org/web/20181021072543/https://www.merriam-webster.com/dictionary/feed (Year: 2018).*

(Continued)

*Primary Examiner* — Benjamin Smith
(74) *Attorney, Agent, or Firm* — Goodwin Procter LLP (57) ABSTRACT

A system and method for advanced document redaction are disclosed. According to one embodiment, a system comprises a parser that analyzes documents to identify structured, semi-structured, and unstructured data from a document. A candidates generator generates a list of words for redaction from the structured, semi-structured, and unstructured data. A replacement engine replaces one or more words from the list of words with one or more of a replacement word, random characters, and random numbers.

16 Claims, 10 Drawing Sheets

(51) Int. Cl.
*G06F 21/62* (2013.01)
*G06F 40/253* (2020.01)
*G06F 40/289* (2020.01)
*G06F 40/40* (2020.01)
*G06N 20/00* (2019.01)

(52) U.S. Cl.
CPC .......... *G06F 40/253* (2020.01); *G06F 40/289* (2020.01); *G06F 40/40* (2020.01); *G06N 20/00* (2019.01)

(56) References Cited

U.S. PATENT DOCUMENTS

| | | | |
|---|---|---|---|
| 8,010,845 B2* | 8/2011 | Rui | G06F 11/0778 714/48 |
| 8,627,483 B2* | 1/2014 | Rachlin | G06F 21/60 726/28 |
| 8,640,252 B2* | 1/2014 | Cragun | G06F 21/83 726/26 |
| 8,700,991 B1* | 4/2014 | Gigliotti | G06F 40/143 715/236 |
| 9,442,923 B1* | 9/2016 | Abou Mahmoud | G06F 40/106 |
| 9,477,913 B2* | 10/2016 | Csurka | G06K 15/4095 |
| 9,734,148 B2 | 8/2017 | Bendersky et al. | |
| 9,754,127 B2* | 9/2017 | König | G06F 21/00 |
| 9,754,128 B2* | 9/2017 | Golic | G06F 21/6254 |
| 9,836,623 B2* | 12/2017 | Carasso | G06F 16/2322 |
| 9,916,464 B2* | 3/2018 | Asthana | G06F 3/1285 |
| 10,032,046 B1* | 7/2018 | Hayashi | H04L 63/0245 |
| 10,043,035 B2* | 8/2018 | LaFever | H04L 9/065 |
| 10,061,773 B1* | 8/2018 | Mankovskii | G06F 16/86 |
| 10,061,937 B1* | 8/2018 | Hayashi | G06Q 10/107 |
| 10,133,879 B2* | 11/2018 | Hayashi | G06F 40/157 |
| 10,275,461 B2* | 4/2019 | Abou Mahmoud | G06F 40/58 |
| 10,311,249 B2* | 6/2019 | Sharifi | G06F 21/35 |
| 10,372,940 B2* | 8/2019 | Ehrenschwender | G06F 21/6254 |
| 10,394,873 B2* | 8/2019 | Mandpe | G06F 40/279 |
| 10,395,772 B1* | 8/2019 | Lucas | G16H 10/60 |
| 10,437,931 B1 | 10/2019 | Matskevich et al. | |
| 10,503,928 B2* | 12/2019 | Stankiewicz | G06F 21/6254 |
| 10,565,173 B2* | 2/2020 | Hemachandran | G06F 16/215 |
| 10,573,312 B1* | 2/2020 | Thomson | G10L 15/22 |
| 10,592,694 B2* | 3/2020 | Carasso | G06F 21/6254 |
| 10,621,378 B1* | 4/2020 | Kim | G06F 21/6245 |
| 10,621,379 B1* | 4/2020 | Kim | G06N 3/04 |
| 10,635,788 B2* | 4/2020 | Kim | G06N 3/045 |
| 10,762,297 B2* | 9/2020 | Deleris | G06F 40/284 |
| 10,769,308 B2* | 9/2020 | Hayashi | G06F 40/157 |
| 10,802,891 B2* | 10/2020 | MacLeod | G06V 30/1985 |
| 10,805,071 B2* | 10/2020 | Wold | H04L 63/0428 |
| 10,902,202 B2* | 1/2021 | Aumann | G06F 16/1744 |
| 11,080,513 B2* | 8/2021 | Shuster | H04L 63/0407 |
| 11,263,335 B2* | 3/2022 | Parthasarathy | G06F 16/24578 |
| 11,436,520 B2* | 9/2022 | Beveridge | G06F 40/205 |
| 11,586,815 B2* | 2/2023 | Olshanetsky | G06N 3/08 |
| 2006/0074833 A1* | 4/2006 | Gardner | G06N 5/04 706/45 |
| 2006/0074836 A1* | 4/2006 | Gardner | G06N 5/04 706/45 |
| 2008/0240425 A1* | 10/2008 | Rosales | G06F 21/6254 380/28 |
| 2009/0089663 A1 | 4/2009 | Rebstock et al. | |
| 2009/0138766 A1* | 5/2009 | Rui | G06F 11/0778 714/57 |
| 2009/0265788 A1* | 10/2009 | Ehrenschwender | G06F 21/6254 380/282 |
| 2010/0131551 A1 | 5/2010 | Benzaken et al. | |
| 2010/0162402 A1* | 6/2010 | Rachlin | G06F 21/60 726/26 |
| 2010/0250497 A1* | 9/2010 | Redlich | H04L 63/105 707/661 |
| 2011/0113049 A1* | 5/2011 | Davis | G16H 10/60 707/757 |
| 2011/0119576 A1* | 5/2011 | Aumann | G06F 16/1744 715/255 |
| 2012/0029908 A1* | 2/2012 | Takamatsu | G06F 40/30 704/9 |
| 2013/0298246 A1* | 11/2013 | Cragun | G06F 21/36 726/26 |
| 2013/0332194 A1* | 12/2013 | D'Auria | G16H 10/60 705/3 |
| 2014/0359782 A1* | 12/2014 | Golic | G06F 21/6254 726/26 |
| 2014/0379377 A1* | 12/2014 | Konig | G16H 10/60 705/3 |
| 2016/0063191 A1 | 3/2016 | Vesto et al. | |
| 2016/0132277 A1* | 5/2016 | Csurka | G06K 15/1867 358/2.1 |
| 2016/0224804 A1* | 8/2016 | Carasso | G06F 16/2322 |
| 2016/0300075 A1* | 10/2016 | Stankiewicz | G16H 50/70 |
| 2016/0321468 A1* | 11/2016 | Stankiewicz | G06F 21/6254 |
| 2017/0109346 A1 | 4/2017 | Shoshan | |
| 2017/0124037 A1* | 5/2017 | Hayashi | G06F 40/157 |
| 2017/0147559 A1* | 5/2017 | Abou Mahmoud | G06F 40/42 |
| 2017/0168998 A1* | 6/2017 | Asthana | G06F 21/608 |
| 2017/0243028 A1* | 8/2017 | LaFever | G06F 21/6254 |
| 2017/0244556 A1* | 8/2017 | Wold | H04L 9/14 |
| 2017/0364523 A1* | 12/2017 | Mandpe | G06F 16/3343 |
| 2018/0046829 A1* | 2/2018 | Carasso | G06F 3/0484 |
| 2018/0060305 A1* | 3/2018 | Deleris | G06F 7/02 |
| 2018/0218173 A1 | 8/2018 | Perkins et al. | |
| 2018/0232407 A1* | 8/2018 | Hemachandran | G06F 16/215 |
| 2018/0260734 A1* | 9/2018 | Beveridge | G06N 20/00 |
| 2018/0276393 A1* | 9/2018 | Allen | H04L 63/0428 |
| 2018/0285591 A1* | 10/2018 | Thayer | G06F 21/6254 |
| 2018/0285592 A1* | 10/2018 | Sharifi | G06F 21/84 |
| 2018/0293283 A1* | 10/2018 | Litoiu | G06F 16/2465 |
| 2019/0018983 A1* | 1/2019 | Anderson | G06F 21/6245 |
| 2019/0042792 A1* | 2/2019 | Hayashi | G06F 40/157 |
| 2019/0104124 A1* | 4/2019 | Buford | H04L 63/10 |
| 2019/0114360 A1 | 4/2019 | Garg et al. | |
| 2019/0138326 A1* | 5/2019 | Horst | G06F 21/6245 |
| 2019/0197296 A1* | 6/2019 | Shuster | G06V 40/16 |
| 2019/0236310 A1* | 8/2019 | Austin | G16H 10/60 |
| 2019/0289034 A1* | 9/2019 | Erez | H04L 63/1416 |
| 2019/0294672 A1 | 9/2019 | Matskevich et al. | |
| 2019/0333607 A1* | 10/2019 | Pletea | G06F 21/6254 |
| 2019/0362093 A1* | 11/2019 | Horst | G06F 21/6254 |
| 2020/0012815 A1* | 1/2020 | Nishimura | G06F 21/602 |
| 2020/0012816 A1* | 1/2020 | Nishimura | G06F 21/602 |
| 2020/0012892 A1* | 1/2020 | Goodsitt | H04L 67/34 |
| 2020/0034520 A1* | 1/2020 | Kim | G06N 3/04 |
| 2020/0034565 A1* | 1/2020 | Kim | G06V 20/52 |
| 2020/0043019 A1* | 2/2020 | Hadavand | G06N 20/00 |
| 2020/0106749 A1* | 4/2020 | Jain | H04L 63/08 |
| 2020/0111021 A1* | 4/2020 | Keyngnaert | G06N 20/20 |
| 2020/0126663 A1* | 4/2020 | Lucas | G06V 30/19013 |
| 2020/0133744 A1* | 4/2020 | MacLeod | G06F 9/541 |
| 2020/0175987 A1* | 6/2020 | Thomson | G10L 15/26 |
| 2020/0250139 A1* | 8/2020 | Muffat | G06V 30/1988 |
| 2020/0293714 A1* | 9/2020 | Olshanetsky | G06F 40/186 |
| 2020/0311304 A1* | 10/2020 | Parthasarathy | G06F 11/3006 |
| 2021/0133557 A1* | 5/2021 | Iyoob | G06N 3/044 |
| 2021/0303791 A1* | 9/2021 | Pletea | G06F 21/6254 |
| 2021/0357512 A1* | 11/2021 | Busila | G06F 21/60 |

OTHER PUBLICATIONS

Dictionary.com, "List", https://www.dictionary.com/browse/list, (2022), 10 pages.
Dictionary.com, "List", https://www.dictionary.com/browse/list https://web.archive.org/web/20170512152507, (May 12, 2017), 11 pages.
John English on Quora, "What is the difference between "masking" and "redacting"?", https://www.quora.com/What-is-the-difference-between-masking-and-redacting, (Mar. 28, 2017), 8 pages.
Larsenal, "A list with only one item", https:english.stackexchange.com/questions/2370/a-list-with-only-one-item, (2010), 4 pages.

(56) References Cited

OTHER PUBLICATIONS

Merriam-Webster, "List", https://www.merriam-webster.com/dictionary/list, (2022), 23 pages.
PCT/EP2020/059470 International Search Report and Written Opinion, dated Jul. 10, 2020.
Satori, "The Fundamentals of Data Redaction", https://satoricyber.com/data-masking/the-fundamentals-of-data-redaction/, (2022), 7 pages.

* cited by examiner

METHOD AND SYSTEM FOR ADVANCED DOCUMENT REDACTION

CROSS-REFERENCE TO RELATED APPLICATIONS

This application is a continuation of application Ser. No. 16/373,216, filed on Apr. 2, 2019, which is incorporated herein by reference in its entirety.

FIELD

The present disclosure relates in general to the field of computer software and systems, and in particular, to a system and method for advanced document redaction.

BACKGROUND

The advent of cloud-based hosting services has enabled many opportunities for service developers to offer additional services that are of much utility to users. To offer these services, a service provider may process a large set of documents for a large number of users in an effort to determine particular patterns in the documents that are indicative of a need for a particular service. To illustrate, a service provider may process messages from an on-line retailer and determine that an order confirmation includes data describing a product and a delivery date. Using this information, the service provider may generate an automatic reminder for a user that serves to remind the user the product is to be delivered on a certain day.

Such information derived from the documents and that is used by a service provider to provide services is generally referred to as a "document data collection." A document data collection can take different forms, depending on how the data are used. For example, a document data collection can be a cluster of documents or a cluster of terms from the documents, where the data are clustered according to a content characteristic. Example content characteristics include the document being a confirmation e-mail from an on-line retailer, or messages sent from a particular host associated with a particular domain, etc. Another type of document data collection is a template that describes content of the set of documents in the form of structural data. Other types of document data collections can also be used.

A service provider may need to analyze and modify the document data collection to improve the performance of the services that utilize the collection. Examination of private data, however, is often prohibited, i.e., a human reviewer cannot view or otherwise have access to the document data collection. Usually during the generation of the document data collection any private user information is removed and not stored in the document data collection; regardless, examination by a human reviewer is still prohibited to preclude any possibility of an inadvertent private information leak. While such privacy safeguards are of great benefit to users, analyzing and improving the quality of the document data collection and the services that use the document data collection can be very difficult due to the access restrictions.

SUMMARY

A system and method for advanced document redaction are disclosed. According to one embodiment, a system comprises a parser that analyzes documents to identify structured, semi-structured, and unstructured data from a document. A candidates generator generates a list of words for redaction from the structured, semi-structured, and unstructured data. A replacement engine replaces one or more words from the list of words with one or more of a replacement word, random characters, and random numbers.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A system and method for advanced document redaction are disclosed. According to one embodiment, a system comprises a parser that analyzes documents to identify structured, semi-structured, and unstructured data from a document. A candidates generator generates a list of words for redaction from the structured, semi-structured, and unstructured data. A replacement engine replaces one or more words from the list of words with one or more of a replacement word, random characters, and random numbers.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present system brings documents out of a customer environment so that issues can be debugged in the service provider's environment. Without the documents in the service provider's environment debugging can take more time and expense. Hence even though a document is a redacted or obfuscated version of a customer's original document, it is important that the service provider's information extraction system work on that document in the same way as it would with the original document. In other words, the extracted content for both the documents match even though the words might be different. For example: if we need to extract first name of a person where the text is "First Name: Ram", it is important that the label 'First Name' is not redacted while the value 'Ram' can be redacted.

Figure 1:
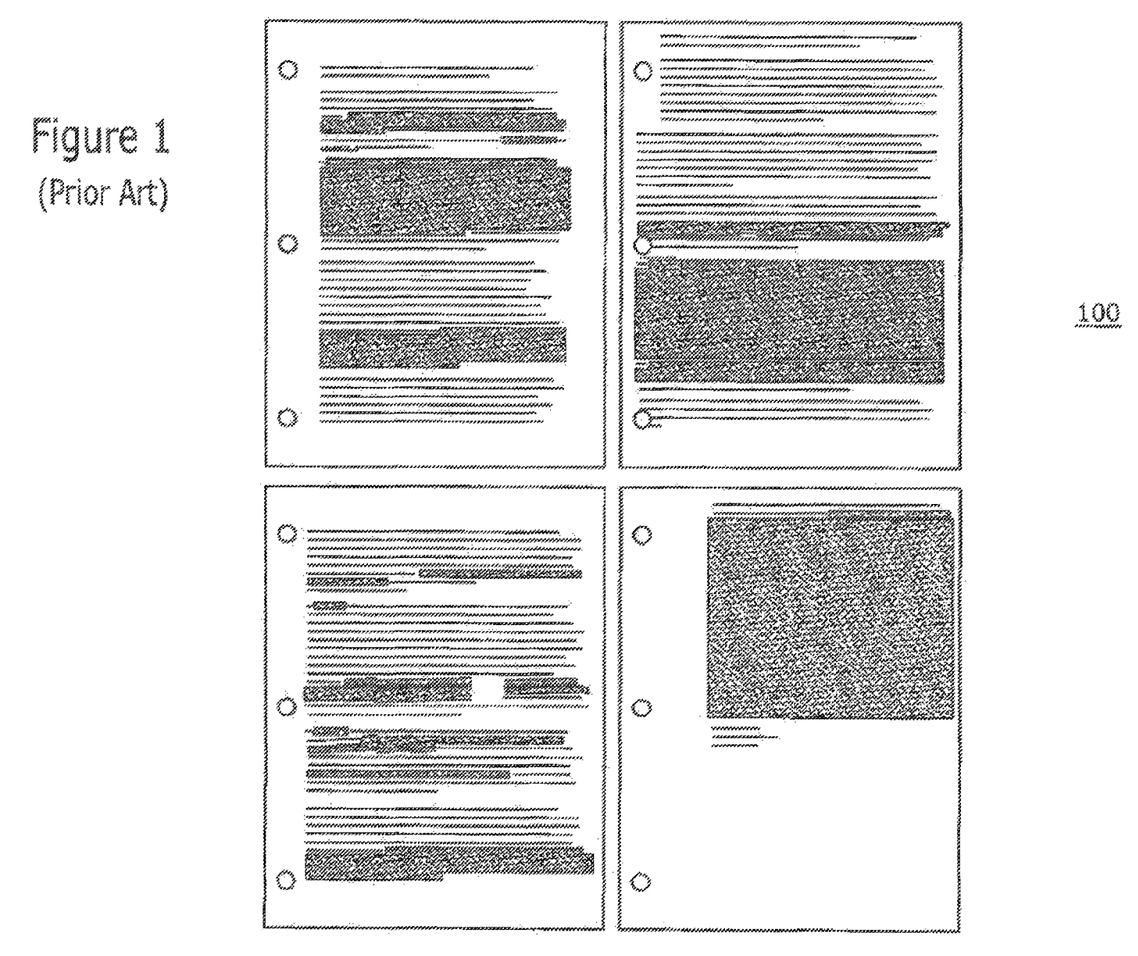
FIG. 1 illustrates a redacted document generated by a prior art redaction system.

FIG. 1 illustrates a redacted document 100 generated by a prior art redaction system. Redacted document 100 has a mask (black) over the confidential content, which is usually generated through human review. This approach is bad for designing commercial scale information extraction systems that process hundreds of thousands of documents. Prior redaction systems are unable to infer patterns or performing grammatical analysis and may introduce additional noise in OCR (optical character recognition) conversion. Prior systems generally are manually cumbersome and require specialized software.

The present system allows confidential documents to be shipped from client environments to a document services provider knowing that the confidential information in those documents has been redacted. This allows the document services system to be better configured with metadata preparations when training machine learning models that benefit from training on real world data. The present redaction system retains the original look and feel of the document and maintains the grammatical integrity of the text after redaction.

The present system handles redactions of PDF documents and also replaces confidential information in the PDF by taking into account the width of the original characters of the confidential information. The present system also redacts non-OCR data (e.g., images, etc.) that may be confidential, while maintaining the lines that form cells or tables. The present system works on structured and semi-structured data to infer patterns and collocation between different values and their labels. This is helpful for ontology discovery and processing. The present system works on unstructured data to retain grammatical integrity and make the content, parser friendly.

Typically, extraction models are trained on data points such as template keywords, table headers, titles, hierarchy of the document, etc. Many times, the confidential data in a document is most often the result of the information extraction process. Accordingly, even if the confidential data is redacted from a set of documents, it will not affect the information extraction model training or application. To further avoid redaction of data points responsible for model training, all such data points can be provided in advance to safely be ignored by the present redaction engine. The present advanced redaction system first finds the data to be redacted and then replaces confidential data with non-confidential data.

Figure 2:
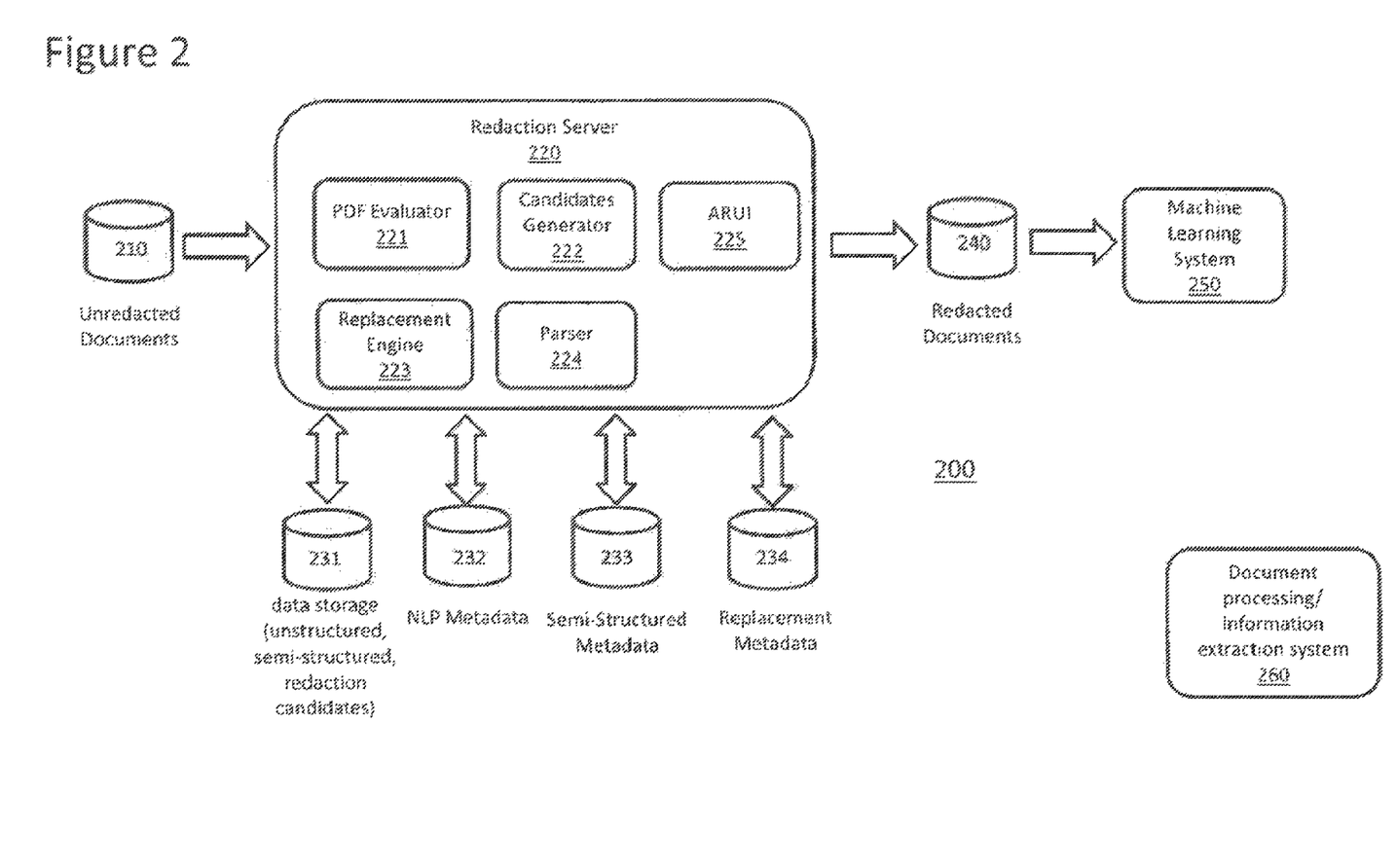
FIG. 2 illustrates an exemplary advanced redaction system, according to one embodiment.

FIG. 2 illustrates an exemplary advanced redaction system 200, according to one embodiment. A redaction server 220 has a PDF evaluator 221, candidates generator 222, replacement engine 223, parser 224, and advanced redaction user interface 225. The redaction server 220 is in communication with databases, such as Natural Language Processing (NLP) metadata database 232, semi-structured metadata database 233, replacement metadata database 234 and data storage 231. Data storage 231 contains unstructured data, semi-structured data and redaction candidates from unredacted documents 210. Advanced redaction server 220 generates redacted documents 240 from unredacted documents 210. Redacted documents 240 can be used to train a machine learning model 250 that will be used in information extraction system 260.

According to one embodiment, the information extraction system 260 operates on a large volume of unredacted documents to identify relevant information used to provide services to end users. To illustrate, a service provider may process messages from an on-line retailer and determine that an order confirmation includes data describing a product and a delivery date. Using this information, the service provider may generate an automatic reminder for a user that serves to remind the user the product is to be delivered on a certain day. The extracted information may also be used for data analytics, report generation, etc. For example, the extracted information may be used to check if an invoice adheres to terms in a contract. The extracted information may also be used to reconcile two documents (e.g., check aggregate total amounts from a table with a total amount mentioned in a paragraph in natural language.) The extracted information may also be used to extract information from different reports into a normalized template.

Unredacted documents 210 and redacted documents 240 may be PDF documents. Although the present specification is described with an emphasis on PDF files, the present advanced redaction system does support other formats like WORD™ documents, Spreadsheets, Presentations, HTML files and text files. Furthermore, although databases 231-234 are individually identified, they may be contained in a single storage system locally, or in the cloud.

Figure 3:
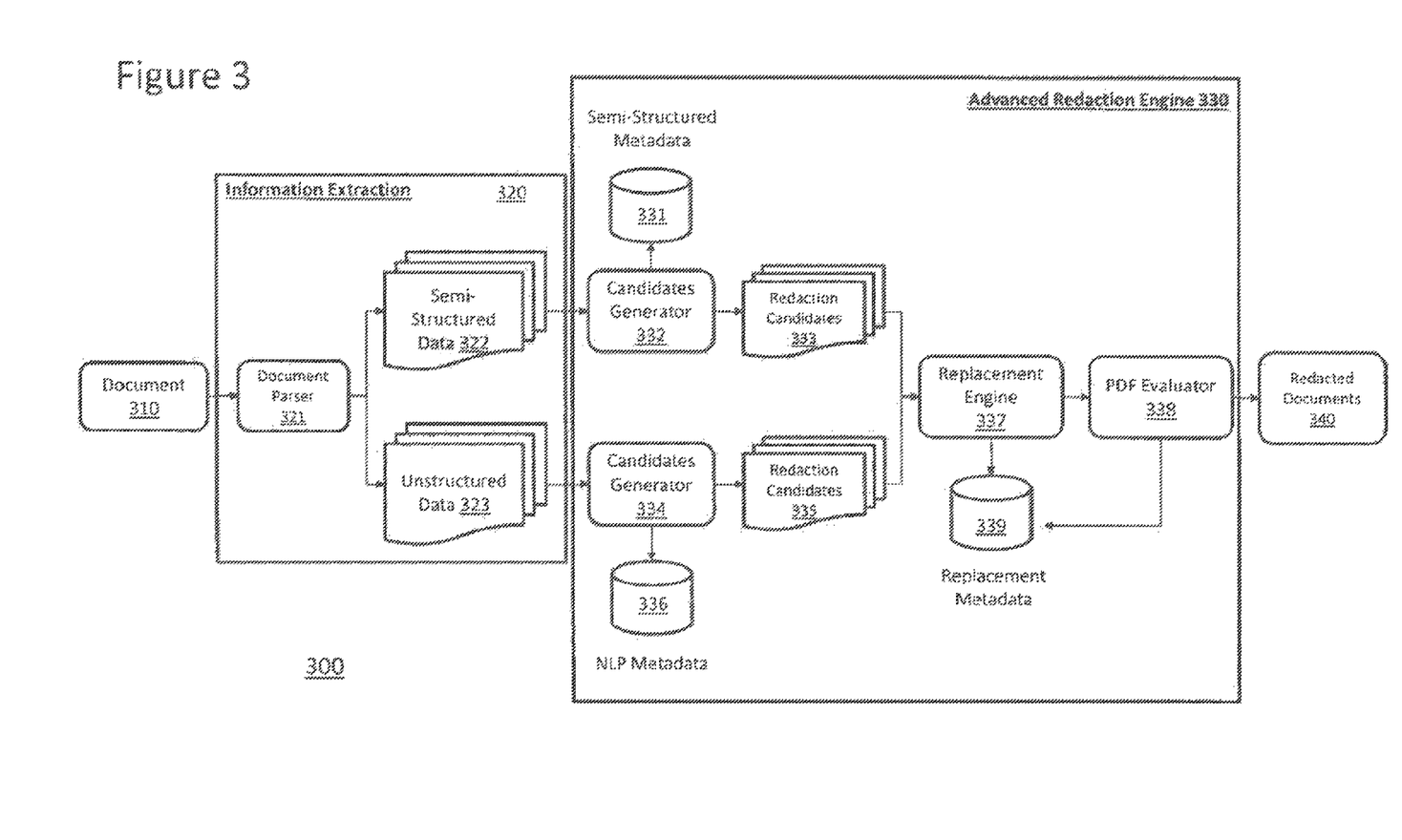
FIG. 3 illustrates an exemplary advanced redaction process, according to one embodiment.

FIG. 3 illustrates an exemplary advanced redaction process, according to one embodiment. Document parser 321 of the information extraction engine 320 identifies semi-structured content 322 and unstructured content 323 from document 310.

Using the semi-structured content 322 and unstructured content 323, the candidates generator 332 and candidates generator 334 generate redaction candidate terms 333, 335.

Candidates generator 332 that processes semi-structured data 322 uses semi-structured metadata 331 to generate redaction candidates 333. Candidates generator 334 that processes unstructured data 323 uses NLP metadata 336 to generate redaction candidates 335.

The semi-structured metadata 331 includes the choice between two techniques—Unique Words or Less Frequent Words. The semi-structured metadata 331 also includes a threshold for less frequent words. According to one embodiment, the less frequent word threshold is between 0 to 1 and is the ratio between the number of documents in which the term occurs and the total number of documents. According to one embodiment, the less frequent threshold can be set at 0.1 or 10%. Thus if the term occurs in less than 10% documents, system 200 deemed the term less frequent.

The NLP metadata 336 includes:
a. Parts-of-Speech (POS) tags that are to be considered for replacement (For example, to replace nouns and adjectives. The POS tags include: Nouns—NN, NNS, NNP, NNPS; Adjectives—JJ, JJR, JJS; etc.)
b. POS tags to be considered for parse tree based replacements (e.g., POS tags that are to be considered by candidate generator 332 that supplies candidates to the parse tree based redaction process. The POS tags are metadata that points to terms to be considered for the POS tag based candidates generator 332. This process is described in detail below.)
c. Threshold for parse tree overlap: After the two parse trees are evaluated for overlap (pre and post redaction), system 200 finds the number of words 'n' that were part of the successful overlap. The percentage difference between n and total number of words becomes the threshold. Hence this can be expressed between 0 and 1. According to one embodiment, the parse tree overlap threshold can be set at 0.75 or 75%.
d. Choice between the two techniques—POS Tags or Parse Trees (A user may choose between the two techniques by providing a selection in the metadata of the system as a Boolean/true-false parameter. By default the present system 300 uses to POS Tags.)

The replacement engine 337 uses the replacement metadata 339 to generate replacement words/text for the redaction candidates 333, 335.

The PDF evaluator 338 is used if the source document 310 is PDF, evaluates whether the generated replacement word/text generated by the replacement engine 337 fits accurately in place of the source word/text of document 310. If a replacement word/text/phrase does not fit accurately, the PDF evaluator 338 may choose to find another replacement word/text/phrase from the replacement metadata database 339, according to one embodiment. In another embodiment, the PDF evaluator may reduce the font size of the replacement word/text/phrase to fit within the redacted document 340.

In PDF format, each character in a document has positional information associated with it (e.g., the x and y coordinates, width and height). Hence the present advanced redaction system 200 chooses text/word/phrase replacements that fit the size reserved for the source text/word/phrase in the original document. If this is not addressed, the replacement word may spill over to the next word, or leave a greater than normal space between the adjacent word and itself. If such an accurate replacement is not located, the font size is adjusted to fit the space within the PDF document 340 correctly.

Replacement Engine (337)

For every confidential data (redaction candidates 333, 335) found in the document 310, the replacement engine 337 carries out the replacements within the document 310 such that the eventual Information Extraction process performed by information extraction system 260 is unhindered. The replacement engine 337 also ascertains that the text/word/phrase replacements are dimensionally equivalent to the source for PDF files. For redaction candidates 333, 335 that are numerical, the digits are individually randomized.

Replacement engine 337 replaces confidential data using two techniques—dictionaries and randomizing characters in a word.

Using Dictionaries of Replacements text/words/phrases: For structured/semi-structured data 322, dictionaries are maintained based on the length of the text/word/phrase to be redacted. For example all 3 letter words are grouped together in one dictionary stored in replacement metadata 339. The Replacement Engine 337 may maintain dictionaries in replacement metadata 339 for up to 20 letter words/text/phrases. The dictionary entries may be configured or revised using ARUI (Advanced Redaction User Interface 225). For unstructured data 323, the dictionaries in replacement metadata 339 are expanded on different Part of Speech (POS) tags that are to be redacted. For example, a three word dictionary for nouns, verbs and adjectives.

Randomizing every character of the word: With this technique, replacement engine 337 replaces every character of the word with a random character or letter of the alphabet.

Figure 4A:
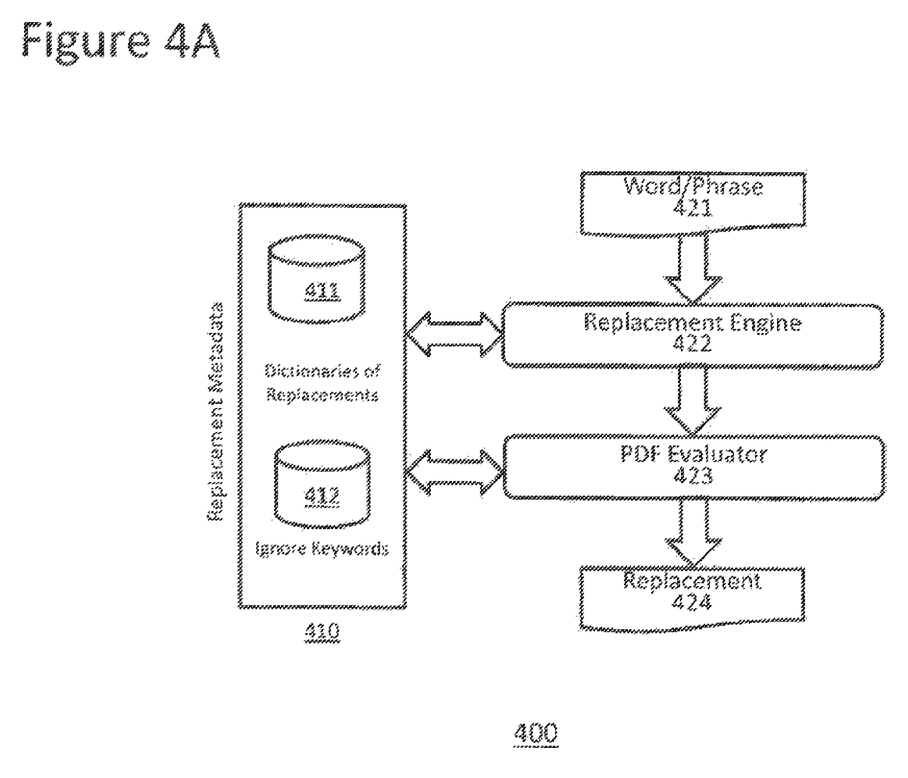
FIG. 4A illustrates an exemplary word/phrase/text replacement process using dictionaries, according to one embodiment.

FIG. 4A illustrates an exemplary word/phrase/text replacement process 400 using dictionaries, according to one embodiment. The dictionaries of replacement 411 and the ignore keywords 412 together form the Replacement Metadata database 410. The PDF evaluator 423 handles PDF specific replacements. If the potential replacements do not fit the dimensions of the original word/phrase/text, PDF evaluator 423 picks an alternative replacement from the dictionary 411. The Ignore Keywords database 412 contains keywords that are never redacted or replaced. The keywords 412 are usually derived from the terms considered for machine learning model training. The Ignore Keywords 412 may also be configured as regular expression patterns. For example, dates may be ignored from redaction with a RegEx pattern such as (\d{1,2})/(\d{1,2})/(\d{4}) (\d{4})-(\d{2})-(\d{1,2}).

Figure 4B:
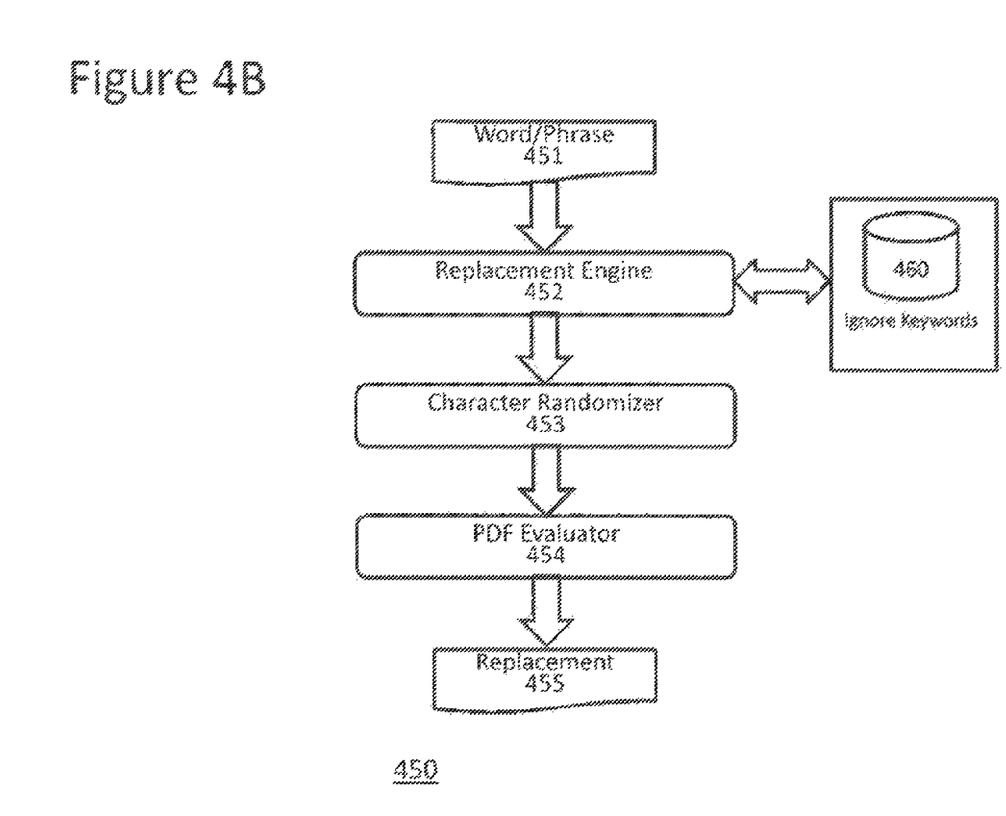
FIG. 4B illustrates an exemplary word/phrase/text replacement process using character randomizing, according to one embodiment.

FIG. 4B illustrates an exemplary word/phrase/text replacement process 450 using character randomizing, according to one embodiment. The ignore keywords 460 forms the Replacement Metadata database 339. Words/text/phrases to be replaced 451, are evaluated by replacement engine 452 to determine whether they include keywords 460 that should be ignored. The words/text/phrases are then replaced by character randomizer 453 with random letters and characters. The PDF evaluator 454 handles PDF specific replacements to ensure the potential replacements 455 fit the dimensions of the original word/phrase/text 451.

According to another embodiment, the present system 300 randomizes selected words and phrases. Given a list of words/text/phrases that represent confidential information, every occurrence of those words/text/phrases is randomized at a character level. Such an obfuscation is achieved by randomizing each character of those words/text/phrases appearing in the document. System 300 performs obfuscation such that the original and the replaced words/text/phrases take the same amount of space on the page. For example, if the letter 'i' is replaced with letter 'x', the resulting width of the word may be larger than the original word. Accordingly, system 300 considers the width of the letter 'i' and replaces it with a similar width letter (e.g., 'l', '1', T, etc.). Also if the appropriate flag is enabled, system 300 randomizes digits across the document. System 300 allows for a list of exceptions (e.g., words/text/phrases) that should not be redacted (e.g., dates in a financial statement that are signaled by a particular word, etc.) For example, "Name: Ramesh" becomes "Name: Kjhgfd" and "Age: 30 Yrs" is not changed/redacted/obfuscated.

According to another embodiment, the present system 300 randomizes everything in a document except metadata keywords identified in advance (e.g., name, age). This process applies redaction at its fullest and still allows the information extraction pipeline. The present system avoids redaction of metadata and specific patterns (e.g., dates in financial statements). For example, "Name: Ramesh" becomes "Name: Kjhgfd" and "Age: 30 Yrs" becomes "Age: 41 Xyz".

Figure 5:
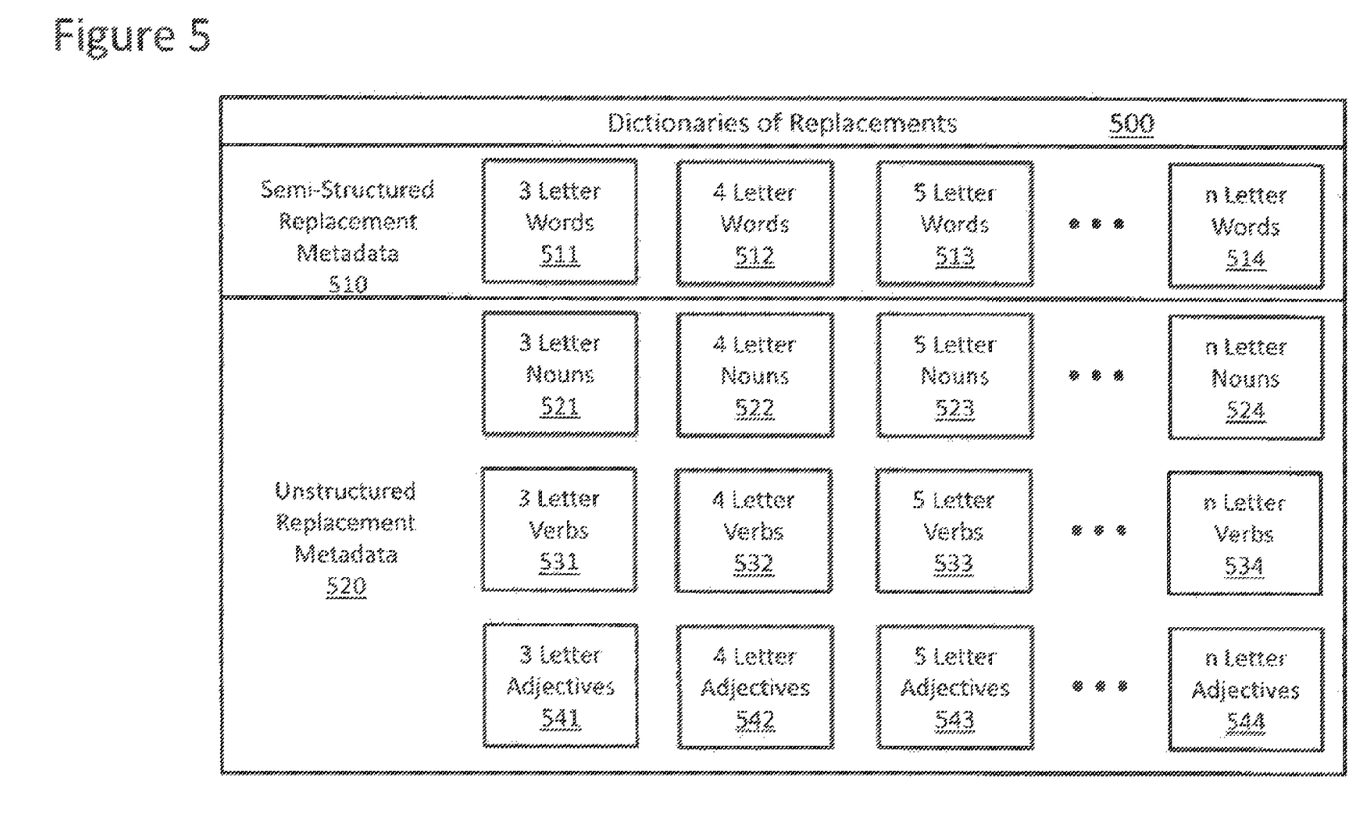
FIG. 5 illustrates an exemplary replacement dictionary, according to one embodiment.

FIG. 5 illustrates an exemplary replacement dictionary 500, according to one embodiment. For semi-structured data 322 the replacements metadata 510 is based on the length of the words, while for unstructured data 323, the replacements metadata database 520 is organized based on the length as well as POS tag of the words. For example, groups are created for 3 letter nouns 521, 4 letter nouns 522, 5 letter nouns 523, to "n" letter nouns 524. Similar groups for verbs 531-534 and adjectives 541-544 are also maintained in unstructured replacement metadata database 520.

Advanced Redaction User Interface (ARUI) (225)

An ARUI is provided where a user can manually apply or undo redaction on specific terms of the document. Additionally, the user may configure the replacement engine metadata 339, specifically the dictionaries of replacements 411 and the ignore keywords 412, 460, as well as the Semi-Structured Metadata 331 and the NLP Metadata 336.

Candidates Generator (221)

As explained above, candidates generator 221 is divided in two categories depending on the data it handles (e.g., structured/semi-structured data 322 and unstructured data 323). It is important to note that for the redaction processes described in this specification, each digit of a number that is a redaction candidate 333, 335 is individually randomized.

The process for generating redaction candidates 333 from structured/semi-structured data considers both unique words and less frequent words.

Unique words: For unique words found throughout the document 310 by the candidates generator 332, the replacement engine 337 finds their replacements from the replacement metadata 339. Such replacements are applied over each occurrence of the unique word across the document 310. Additionally, the replacement engine 337 ignores unique words from redaction that were used in the model training exercise. These unique words are metadata for the information extraction engine 320 and are utilized by the information extraction pipeline to extract the structured, semi-structured and unstructured information. If the POS metadata is redacted, the respective information will not be extracted by the system 300, accurately. The information extraction engine 320 uses metadata and user configurations to configure the system 300 for a particular project/customer. These two together are referred as model training. The content of the model training data does not have confidential information, so the content can be safely skipped from redaction. In other words, if the candidate generator 332, 334 generates a set of unique words for redaction, the set of unique words is filtered based on the content considered during model training.

Figure 6A:
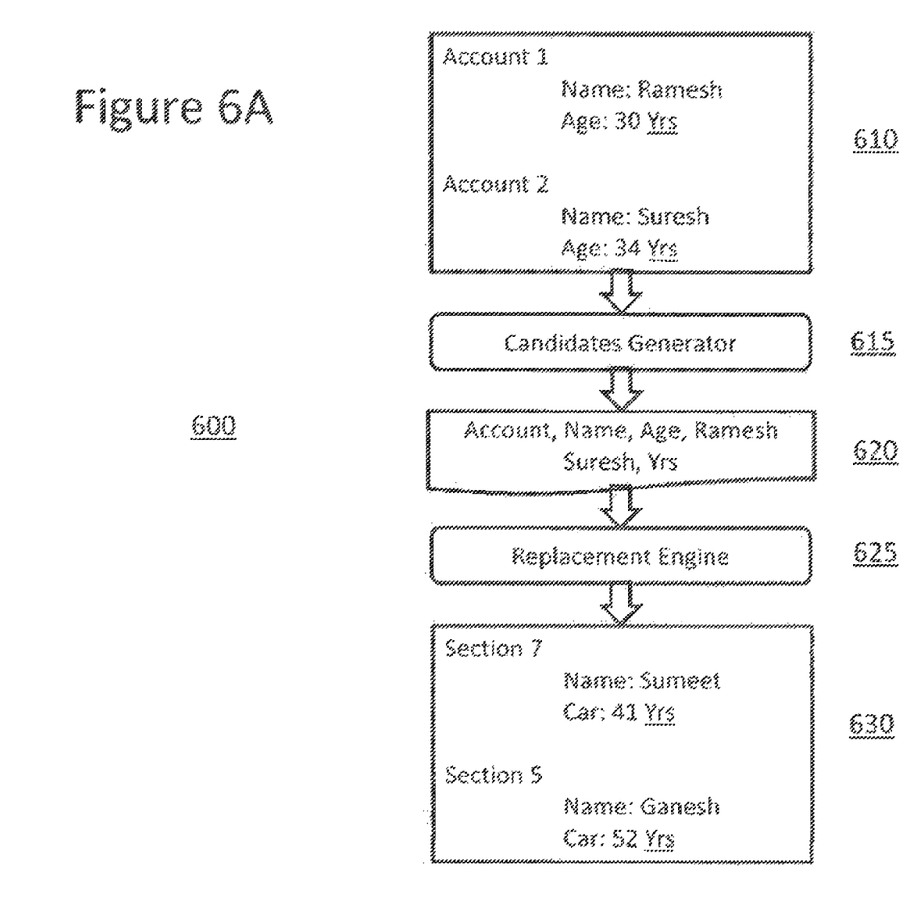
FIG. 6A illustrates an exemplary replacement process with a dictionary approach, according to one embodiment.

FIG. 6A illustrates an exemplary replacement process 600 with a dictionary approach, according to one embodiment. Candidates generator 615 identifies all unique words from document 610 as candidates for redaction 620 (e.g., Account, Name, Age, Ramesh Suresh, Yrs.) The term 'Name:' isn't redacted and replaced because it is part of the model training exercise and hence part of the ignore keywords list 412. Replacement engine 625 generates redacted document 630 with replacement words from the dictionary of replacements 411. Also we can note that the replacements are consistent across occurrences (e.g. the replacement for Account is same on both occasions.)

Figure 6B:
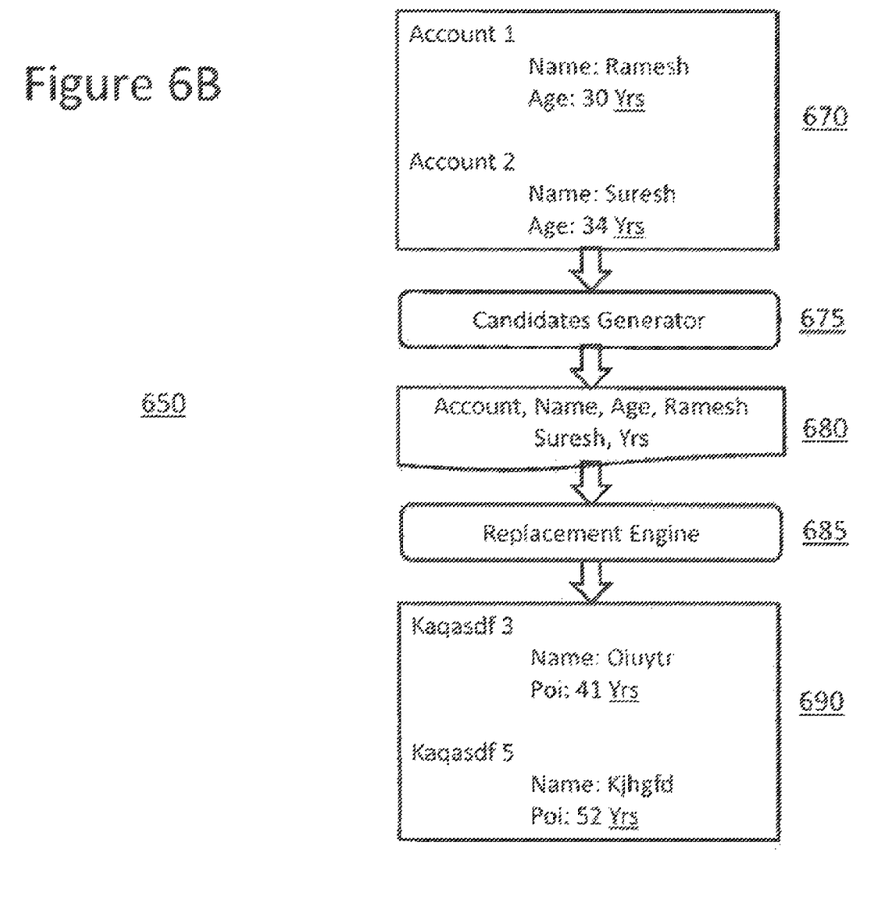
FIG. 6B illustrates an exemplary replacement process 650 with random character replacement, according to one embodiment.

FIG. 6B illustrates an exemplary replacement process 650 with random character replacement, according to one embodiment. Candidates generator 675 identifies all unique words from document 670 as candidates for redaction 680 (e.g., Account, Name, Age, Ramesh Suresh, Yrs.) Replacement engine 685 generates redacted document 690 with random character replacements for the redaction candidates 680. The term 'Name:' isn't redacted and replaced because it is part of the model training exercise and hence part of the ignore keywords list. The replacements are consistent across occurrences (e.g. the replacement for Account is same on both occasions.)

Less frequent words: Candidates generator 332 works on a group of similar documents or documents from the same template. For example, similar documents to document 610 are overlaid on top of each other to find the similar and dissimilar content. Candidates generator 615 identifies the terms "Account," "Name," "Age" and "Yrs" as frequently occurring terms in the template. Hence, candidates generator 615 ignores these terms and redaction engine 625 only replaces the words "Ramesh" and "Suresh." The candidates generator 615 thus generates the terms that are unique or less frequent in the group of documents. Frequently occurring terms and phrases are not confidential, while the less frequent term/phrases are confidential. Here the candidates generator 615 considers the frequency of terms across documents and not frequency of terms within the document 610. A definable document overlap threshold for the percentage of documents in which the terms occur across documents determines whether it is a less frequent term to be replaced. This document overlap threshold is specified in semi-structured metadata 331. Candidates generator 675 operates in a similar manner as candidates generator 615 for identifying less frequent terms in a document 670. Replacement engine 685 then replaces the less frequent terms with randomized characters.

Figure 7:
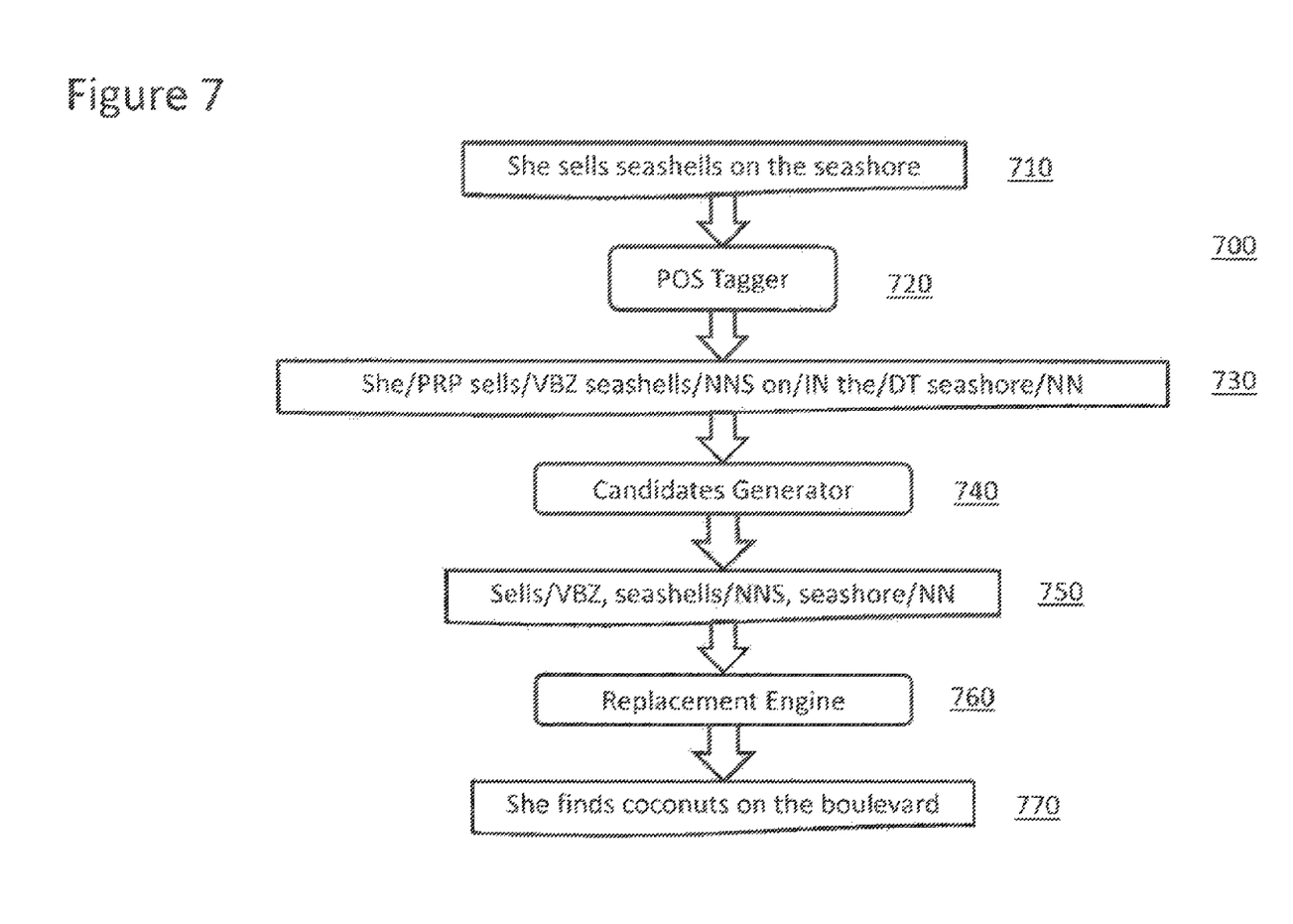
FIG. 7 illustrates an exemplary POS tag process, according to one embodiment.

Candidate generator 334 generates candidates 335 from unstructured data 323 with the following:

POS Tags: In this process, candidates generator 334 breaks down unstructured content/data 323 into sentences and then each sentence is subjected to a POS (Part of Speech) tagger. The candidates for redaction 335 are generated based on NLP metadata 336. The replacement engine 337 analyzes each sentence. Replacement engine 337 generates replacements on specific POS tags as identified in replacement metadata 339, and specifically its dictionaries 411. FIG. 7 illustrates an exemplary POS tag process 700, according to one embodiment. The sentence 710 ("She sells seashells on the seashore") is POS tagged by POS tagger 720 with the tags: /PRP (pronoun), /VBZ (plural verb), /NNS (plural noun), /IN (preposition), /DT (definite article) and /NN (singular noun) to generate tagged sentence 730. Candidates generator uses NLP metadata 336 that specifies that nouns and verbs are only to be candidates for redaction 750. Thus only the nouns—seashells and seashore, and the verb—sells, are redacted. Replacement engine 760 then replaces those words to generate the redacted and replaced sentence 770 ("She finds coconuts on the boulevard".) Focusing on nouns and verbs accurately redacts most of the confidential data in a document when numbers are also randomized.

Figure 8:
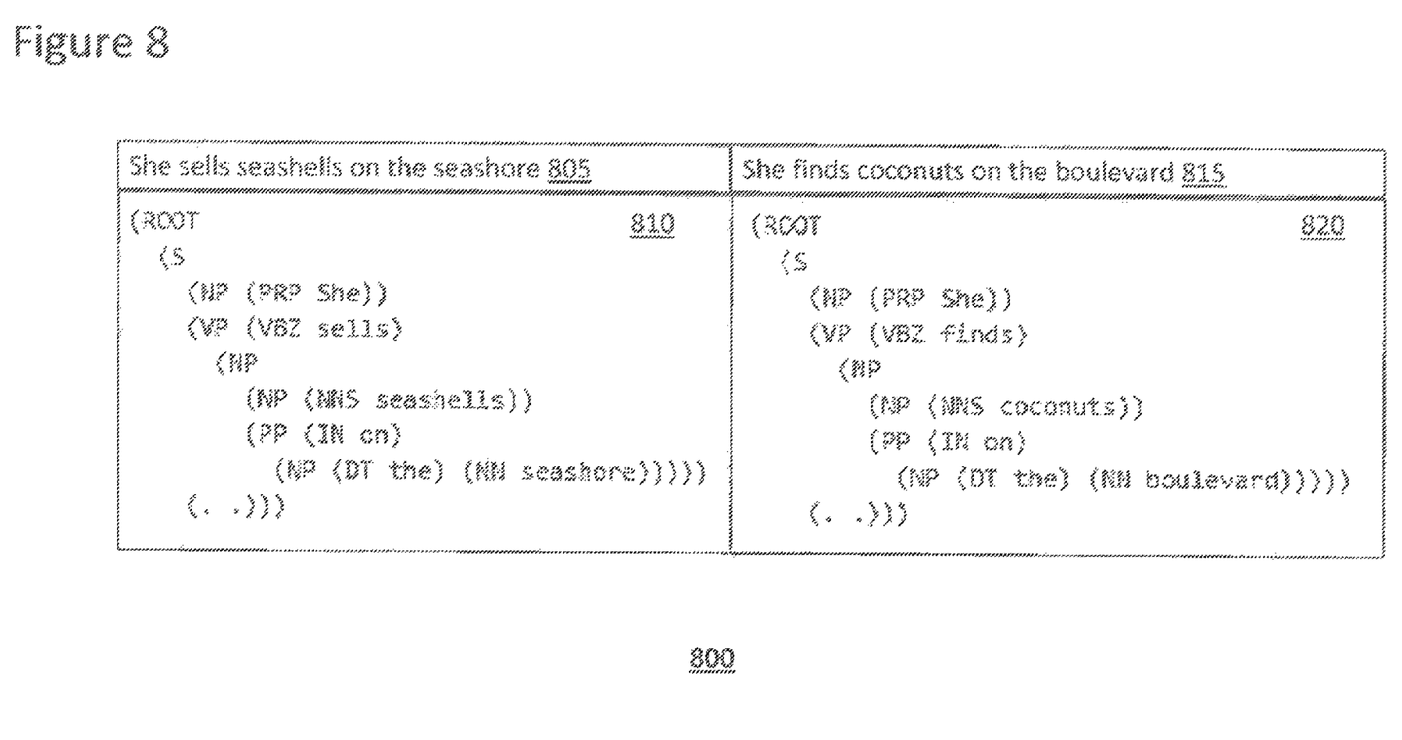
FIG. 8 illustrates an exemplary parse tree comparison process 800, according to one embodiment.

Parse Trees: This process focuses more on the grammatical integrity of the sentence after replacements. Here we replace the words based on the POS tag dictionary from POS process 700, but additionally tests the replaced sentence to determine if the replacement sentence's parse overlaps with the parse from the original sentence. FIG. 8 illustrates an exemplary parse tree comparison process 800, according to one embodiment. Parse tree 810 for original sentence 805 completely overlaps with parse tree 820 for redacted and replaced sentence 815. If the nouns and verbs are redacted, usually the parse is kept intact, and hence the downstream process of information extraction by information extraction system 260 is unaffected. Replacement engine 337 compares both the trees from the root node. As soon as the replacement engine 337 finds any difference in any of the branches, it stops the comparison for that branch. After all branches are compared, top to bottom, the present system 200 checks the count of the words C in the sentence that were covered during successful matches and the count of words C' that were skipped. The percentage difference between C and C' determines whether the parses match. This parse tree threshold may be specified by the user in the NLP metadata 336.

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A system, comprising:
a non-transitory computer readable storage medium having computer program code stored thereon, which when executed by one or more processors implemented on a computing machine, presents a redaction server comprising:
a redaction engine that receives structured, semi-structured, and unstructured content, the redaction engine comprising:
a first candidate generator that generates first redaction candidates for the received structured and semi-structured content, wherein the first candidate generator uses structured and semi-structured metadata based on word length to generate the first redaction candidates;
a second candidate generator configured to:
parse the unstructured content into sentences so that each sentence is subjected to a Parts-of-Speech (POS) tagger to generate POS tags; and
identify second redaction candidates for the generated POS tags from Natural Language Processing (NLP) metadata based on word length, wherein the NLP metadata includes replacements for the generated POS tags;
a replacement engine that generates replacement characters for the first and second redaction candidates based on dictionaries found in replacement metadata; and
a document evaluator that adjusts a font size of the replacement characters generated by the replacement engine so that the replacement characters generated by the replacement engine fit dimensionally in place of corresponding redactable source characters in the received structured, semi-structured, and unstructured content.

2. The system of claim 1, wherein the redaction server further comprises an information extraction module, and wherein the redaction engine is configured to receive the structured, semi-structured, and unstructured content from the information extraction module.

3. The system of claim 2, wherein the structured, semi-structured, and unstructured content are extracted from one or more unredacted documents received by a document parser in the information extraction module.

4. The system of claim 3, wherein the one or more unredacted documents comprise at least one of Portable Document Format (PDF) documents, word processing application documents, spreadsheets, presentations, HyperText Markup Language (HTML) files, or text files.

5. The system of claim 1, wherein the replacement engine generates one or more redacted documents from the one or more unredacted documents.

6. The system of claim 5, further comprising a machine learning system that uses the one or more redacted documents for training a model.

7. A method comprising:
receiving, at a redaction engine, structured, semi-structured, and unstructured content extracted from an unredacted document;
generating, with a first candidate generator, first redaction candidates for the received structured and semi-structured content, wherein the first candidate generator uses structured and semi-structured metadata based on word length to generate the first redaction candidates;
parsing, with a second candidate generator, the unstructured content into sentences so that each sentence is subjected to a Parts-of-Speech (POS) tagger to generate POS tags, and identifying second redaction candidates for the generated POS tags from Natural Language Processing (NLP) metadata based on word length, wherein the NLP metadata includes replacements for the generated POS tags;
generating, with a replacement engine, replacement characters for the first and second redaction candidates based on dictionaries found in replacement metadata; and
replacing, with the replacement engine, redactable source characters in the received structured, semi-structured, and unstructured content with the generated replacement characters to produce a redacted document, wherein replacing the redactable source characters comprises adjusting a font size of the replacement characters to ensure that the replacement characters fit dimensionally in place of the redactable source characters.

8. The method of claim 7, wherein before receiving, at the redaction engine, the structured, semi-structured, and unstructured content:
analyzing the unredacted document at an information extraction module to extract the structured, semi-structured, and unstructured content from the unredacted document prior to sending the structured, semi-structured, and unstructured content to the redaction engine.

9. The method of claim 8, wherein analyzing the unredacted document to extract the structured, semi-structured, and unstructured content comprises parsing the unredacted document with a document parser.

10. The method of claim 7, wherein the unredacted document comprises at least one of a Portable Document Format (PDF) document, a word processing application document, a spreadsheet, a presentation, a HyperText Markup Language (HTML) file, or a text file.

11. A system, comprising:
a non-transitory computer readable storage medium having computer program code stored thereon, which when executed by one or more processors implemented on a computing machine, presents a redaction server comprising:
an information extraction engine that receives one or more unredacted documents and extracts structured, semi-structured, and unstructured content from the one or more unredacted documents; and a redaction engine communicatively coupled to the information extraction engine and comprising:
  a first candidate generator that generates first redaction candidates for the structured and semi-structured content, and uses structured and semi-structured metadata based on word length to generate the first redaction candidates;
  a second candidate generator configured to:
    parse the unstructured content into sentences so that each sentence is subjected to a Parts-of-Speech (POS) tagger to generate POS tags; and
    identify second redaction candidates for the generated POS tags from Natural Language Processing (NLP) metadata based on word length, wherein the NLP metadata includes replacements for the generated POS tags;
  a replacement engine that generates replacement characters based on dictionaries found in replacement metadata to replace redactable source characters in the structured, semi-structured, and unstructured content thereby producing respective one or more redacted documents from the one or more unredacted documents; and
  a document evaluator that adjusts a font size of the replacement characters to ensure that the replacement characters generated by the replacement engine fit dimensionally in place of the redactable source characters.

12. The system of claim 11, wherein the one or more unredacted documents comprise at least one of a Portable Document Format (PDF) document, a word processing application document, a spreadsheet, a presentation, a HyperText Markup Language (HTML) files, or a text file.

13. The system of claim 11, wherein the information extraction engine extracts the structured, semi-structured, and unstructured content with a document parser configured to identify structured, semi-structured, and unstructured data.

14. The system of claim 11, further comprising a machine learning system that uses the one or more redacted documents produced by the redaction server for training a model.

15. The system of claim 14, further comprising an information extraction system that uses the model trained with the one or more redacted documents to redact unredacted documents.

16. The system of claim 15, wherein the information extraction system is configured to redact documents by identifying information in the documents and to use the identified information to provide analytics and report generation and to provide services to end users.

\* \* \* \* \*